(12) United States Patent
Hong et al.

(10) Patent No.: US 6,611,265 B1
(45) Date of Patent: Aug. 26, 2003

(54) MULTI-STAGE FIXED CYCLE PIPE-LINED LIGHTING EQUATION EVALUATOR

(75) Inventors: Mike Hong, Cupertino, CA (US); Dong-Ying Kuo, Pleasanton, CA (US); Mark Shuxin Zheng, San Jose, CA (US)

(73) Assignee: S3 Graphics Co., Ltd., Grand Cayman (VG)

( * ) Notice: Subject to any disclaimer, the term of this patent is extended or adjusted under 35 U.S.C. 154(b) by 157 days.

(21) Appl. No.: 09/691,644

(22) Filed: Oct. 18, 2000

(Under 37 CFR 1.47)

Related U.S. Application Data

(60) Provisional application No. 60/160,291, filed on Oct. 18, 1999.

(51) Int. Cl.[7] .................................................. G06T 17/00
(52) U.S. Cl. ....................................... 345/426; 345/581
(58) Field of Search .................................. 345/418, 419, 345/426, 428, 581, 589

(56) References Cited

U.S. PATENT DOCUMENTS

| 4,866,637 | A | | 9/1989 | Gonzalez-Lopez et al. . 364/518 |
| 4,901,064 | A | | 2/1990 | Deering |
| 5,659,671 | A | | 8/1997 | Tannenbaum et al. |
| 5,805,782 | A | | 9/1998 | Foran .......................... 395/126 |
| 5,912,830 | A | | 6/1999 | Krech, Jr. et al. ........... 364/753 |
| 5,914,724 | A | | 6/1999 | Deering et al. .............. 345/431 |
| 5,935,198 | A | | 8/1999 | Blomgren .................... 708/290 |
| 5,949,424 | A | | 9/1999 | Cabral et al. ................ 345/426 |
| 6,037,947 | A | * | 3/2000 | Nelson et al. ............... 345/426 |
| 6,141,013 | A | * | 10/2000 | Nelson et al. ............... 345/426 |
| 6,252,608 | B1 | * | 6/2001 | Snyder et al. ............... 345/422 |

OTHER PUBLICATIONS

Lecture 40 material from http://www–ee.eng.hawaii.edu, Oct. 14, 1999 (6 pages).
Lecture 39 material from http://www–ee.eng.hawaii.edu, Oct. 14, 1999 (5 pages).
Lecture 22 material from http://www–ee.eng.hawaii.edu, Oct. 14, 1999 (5 pages).
OpenGL Standard, Sections 2.13.1–2.13.9, Apr. 1, 1999.

* cited by examiner

Primary Examiner—Cliff N. Vo
(74) Attorney, Agent, or Firm—Carr & Ferrell LLP

(57) ABSTRACT

A lighting evaluation unit in a graphics processing system. The lighting evaluation unit includes a calculation unit having dot product circuitry used in determining specular, diffuse, spot, and attenuation components of a lighting equation in parallel. In one embodiment, the lighting evaluation unit is constructed in a pipeline manner, and includes multi-use circuitry for performing dot product calculations.

16 Claims, 12 Drawing Sheets

MULTI-STAGE FIXED CYCLE PIPE-LINED LIGHTING EQUATION EVALUATOR

CROSS-REFERNCE TO RELATED APPLICATIONS

The application claims the benefit of U.S. Provisional application No. 60/160,291 filed Oct. 18, 1999, the disclosure of which is incorporated by reference herein.

BACKGROUND OF THE INVENTION

The present invention relates generally to graphics accelerators, and in particular to a graphics accelerator lighting evaluation unit.

Graphics accelerators are often used to determine display information for realistic scene displays by computer systems. In determining the display information, graphics accelerators process large amounts of data at extremely high speeds. As the determination of the characteristics of any display may be complex, the processing performed by the graphics accelerators is both complicated and computationally expensive.

An example of the complicated processing performed by graphics accelerators is that associated with the effects of lighting on an object. The effects of lighting on an object are, in a simple case, merely determining whether an object is illuminated and therefore visible, or is not illuminated and therefore invisible. Such simple cases, however, are rare.

In general, the appearance of an object is defined by light generated by or reflected from the object which reaches a viewer. Examples of light generated by objects is the light generated by a light bulb or the light generated by the sun. With respect to reflected light, the possibilities are more complex. For example, the light may come from a variety of sources, at different locations, and the light sources may generate different colors. In addition, reflected light is a function of the material from which the light is reflected, both in terms of color and reflectivity. Moreover, the relative position of both the light sources, the object from which the light is reflected, and the position of the viewer also cause the light received by the viewer to change.

Accordingly, a number of factors affect the effects of lighting on an object. These factors are combined in complex calculations in order to provide realistic displays. Many of these factors, particularly these that relate to the geometry, or relative position, of the viewpoint and the objects, change dynamically in real time.

General purpose arithmetic logic units (ALUs) are sometimes used by graphics accelerators to perform the complex calculations required to provide realistic lighting. ALUs include logic to perform complex calculations. Graphics accelerators, however, are continually pressed to provide ever increasing functions at ever increasing speeds. Moreover, graphics accelerators are often required to perform calculations on a vertex by vertex basis, for exceedingly large numbers of vertices. ALUs, not being specially designed for the exact use to which graphics accelerators may put them, often impose timing constraints which impact the ability of graphics accelerators to provide increasing realism and functionality.

SUMMARY OF THE INVENTION

The present invention provides a graphics processing system having a lighting evaluation unit. In one embodiment the lighting evaluation unit comprises a calculation unit including a dot product circuit, the dot product circuit calculating a dot product between two vector representations. In one embodiment the lighting calculation unit determines specular, diffuse, spot, and attenuation components of a lighting equation in parallel. In one embodiment the lighting calculation unit multiplexes data into dot product circuitry in a sequential pipelined manner to calculate lighting for a vertex. In one embodiment the lighting calculation unit comprises pipeline circuitry performing lighting equation evaluations on a vertex-by-vertex basis as well as on a light-by-light basis.

These and other aspects of the present invention are more readily understood when considered in conjunction with the accompanying drawings and following detailed description.

DETAILED DESCRIPTION

Figure 1:
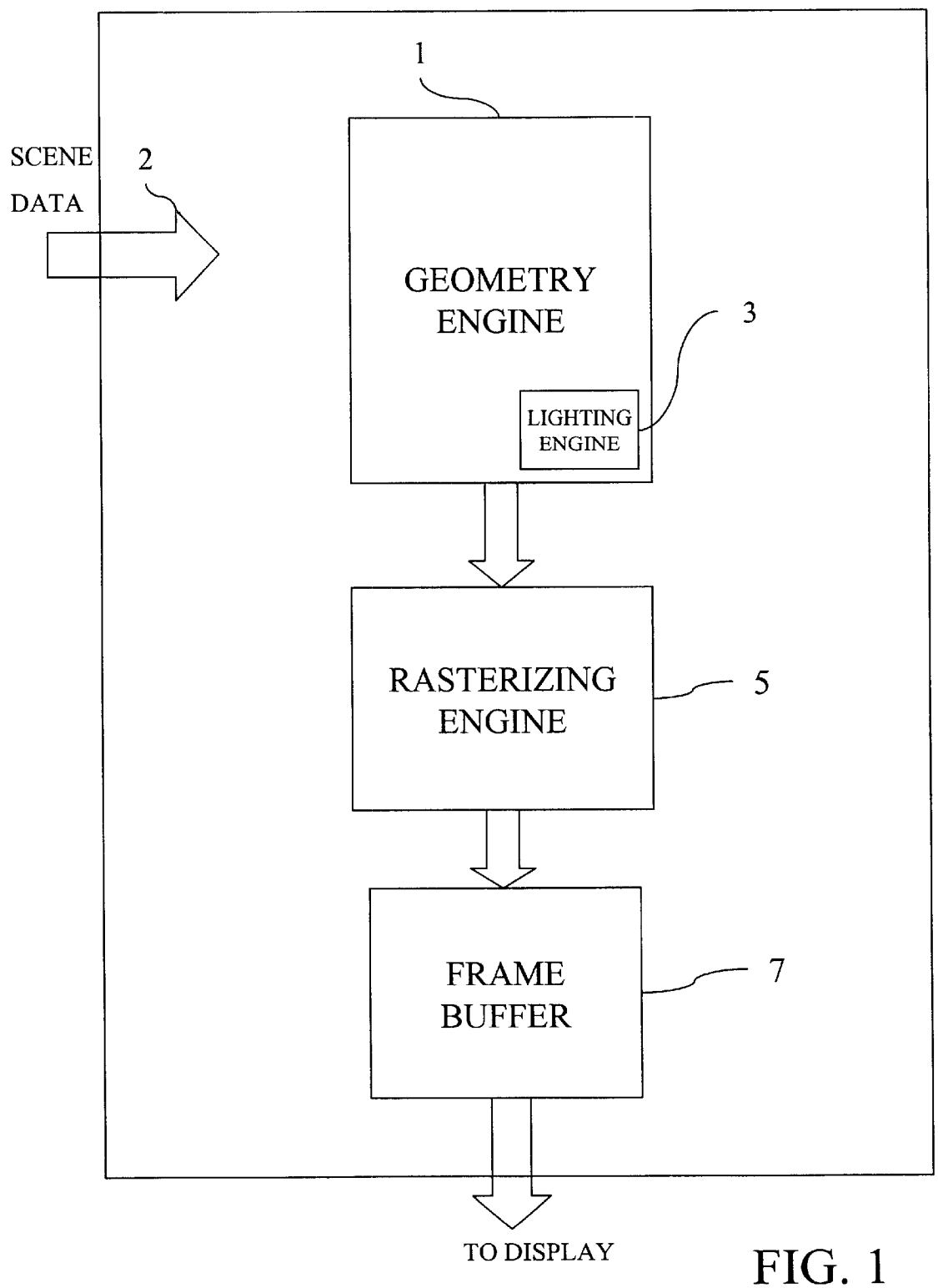
FIG. 1 is a block diagram of a graphics processing system in accordance with the present invention.

FIG. 1 illustrates a block diagram of a graphics processing system. A graphics processing system receives scene data 2 from, for example, a CPU (not shown). The scene data includes information relating to an eye point of a viewer and the location of objects, including light sources, around the eye point. The graphics processing system processes the data in order to provide display information for a visual display.

The scene data is generally in terms of a three-dimensional space, while the display is generally a two-dimensional screen. Accordingly, processing is performed by the graphics processing system to determine what may be seen from the eye point, the colors of items seen from the eye point, and how those items should be displayed on the two-dimensional screen to provide a three-dimensional effect. Thus, as shown in the simplified block diagram of FIG. 1, the graphics processing system includes a geometry engine 1. The geometry engine transforms the data into two-dimensional coordinates by performing geometry processing. Geometry processing includes transforming the data to a projection, i.e. screen, coordinate system, clipping the data to avoid rendering items off the screen, and performing lighting calculations. Accordingly, the geometry engine includes a lighting engine. The lighting engine maintains information regarding light sources, and calculates how those light sources affect the display of any particular object. The lighting engine, therefore, receives data from the CPU, as well as receives data from other portions of the geometry engine.

The geometry engine provides information to a rasterizing engine 5. The rasterizing engine converts the information provided by the geometry engine, which is based on polygons, generally triangles, into pixels. The process of rasterizing, or rendering, often includes varying the level of detail, blending information, and other processing to further increase the realism of the display.

The rasterizing engine provides pixel data to a frame buffer 7. The frame buffer comprises memory for storing information related to the display of a pixel. As illustrated, the frame buffer is part of the graphics processing system. In many implementations, the geometry engine, including the lighting engine, and the rasterizing engine are on a single chip, with the frame buffer being comprised of off chip memory.

Figure 2:
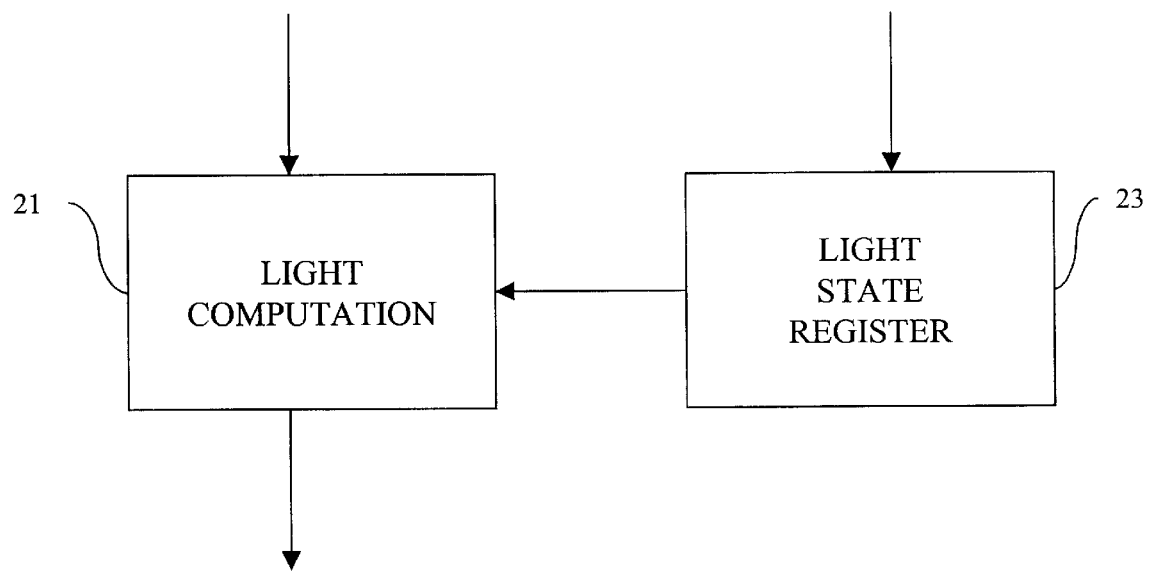
FIG. 2 is a block diagram of the lighting engine of FIG. 1.

FIG. 2 illustrates a top level block diagram of the lighting engine of FIG. 1. The lighting engine includes a light computation unit 21 and a light state register 23. The light computation unit calculates the effects of lighting on objects for polygons, i.e., triangles, on a vertex-by-vertex basis. The light computation unit receives vertex information from the geometry engine. In the embodiment described the vertex information includes vertex location and, as the vertices represent locations on a surface of an object, a normal direction of the surface. The light computation unit also receives lighting source information from the light state register 23. The light state register holds data, such as position, location, color, intensity, and directivity, relating to light sources.

Figure 3:
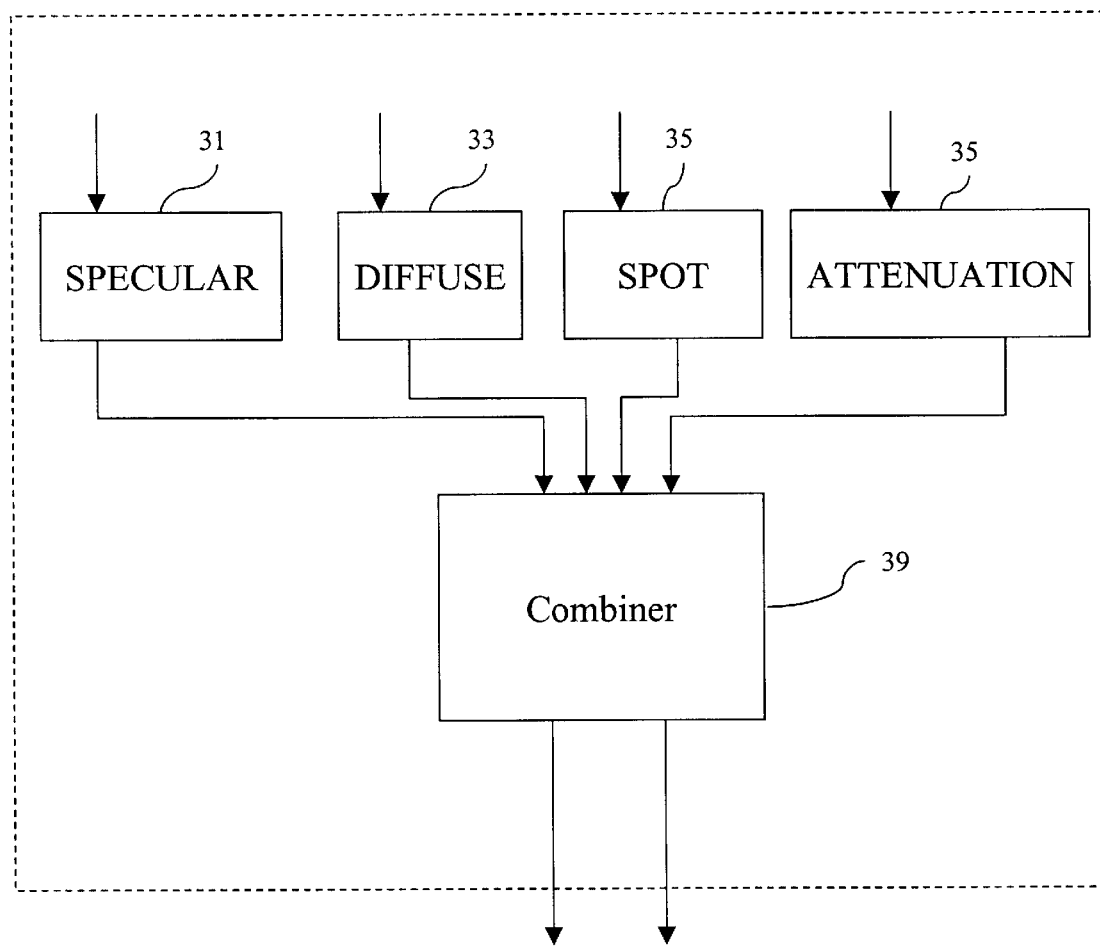
FIG. 3 is a block diagram illustrating details of the lighting engine of FIG. 1.

FIG. 3 illustrates further details of one embodiment of the lighting computation unit of FIG. 2. As illustrated, the lighting computation unit of FIG. 3 includes an attenuation block 37, a spot block 35, a diffuse block 33 and a specular block 31. The lighting computation unit also includes a combiner block 39. The attenuation, spot, diffuse and specular blocks include circuitry for performing lighting calculations. In the embodiment described the circuitry generally performs Gouraud shading, namely lighting calculations on a per vertex basis. More specifically, in the embodiment described the attenuation, spot, diffuse, and specular blocks perform calculations in accordance with the OpenGL 1.2 specification. The OpenGL 1.2 specification defines equations for determining the effects of lighting, and is described in Section 2.13.1 of the OpenGL 1.2 specification, available from Silicon Graphics Corporation, the entirety of which is incorporated herein by reference.

In general for separate specular color, equations in accordance with the OpenGL lighting equation are $$c_d = e_m + a_m * a_s + \sum_{i=0}^{n-1} (att_i)(spot_i)\left(L_a + \left(\frac{\vec{n}}{|\vec{n}|} \cdot \frac{\vec{PL}}{|\vec{PL}|}\right) * L_d\right)$$

$$c_s = \sum_{i=0}^{n-1} (att_i)(spot_i)\left(\frac{\vec{n}}{|\vec{n}|} \cdot \frac{\vec{PL}+\vec{P}}{|\vec{PL}+\vec{P}|}\right)^{Srm} * L_s$$

where $e_m$ is material emissivity, $a_m$ is the ambient color of a vertex, as is the ambient color of a scene, $att_i$ is the attenuation factor, $spot_i$ is the spotlight effect factor, $L_a$ is a lighting ambient component, $\vec{n}$ is a vector normal to the surface at the vertex, $\vec{PL}$ is a vector from the vertex to a light source, $L_d$ is a diffuse lighting component, $\vec{P}$ is a vector from an eyepoint to the vertex, Srm is a spotlight shininess factor, and $L_s$ is a specular lighting component.

With some specificity, the attenuation factor is equal to $1/k_c+k_1d+k_qd^2$, where $k_c$ is a constant attention factor, $k_l$ is a linear attenuation factor, $k_a$ is a quadratic attenuation factor, and d is the distance from the vertex to the light source. Similarly, the spotlight effect factor is equal to $$\left(\frac{\vec{PL}}{|\vec{PL}|} \cdot \frac{\vec{s}}{|\vec{s}|}\right)^{(spotlight)}, \text{ where } \vec{s} \text{ is a vector in the}$$

direction of the spotlight. Finally, the lighting ambient component $L_a$ is equal to the ambient color of the vertex times the ambient intensity of the light source, $L_d$ is equal to the diffuse intensity of the vertex times the diffuse intensity of the light source, and $L_s$ is equal to the specular color of the vertex times the specular intensity of the light source.

Accordingly, a color for specific vertex is function of the ambient, diffuse, and specular components of the material and the lighting for the vertex, taking into account attenuation and spot light effects. In the embodiment of FIG. 3, calculations for each of these components are determined in parallel, with the result combined in the combiner. Thus, the attenuation block determines the attenuation factor, the specular block determines the specular component, the diffuse block determines the diffuse component and the ambient component, and the spotlight block determines the spotlight factor.

Accordingly, the attenuation block includes circuitry for determining attenuation. The spot block include circuitry for determining spot light effects at the vertex. The diffuse block include circuitry for determining the effects of diffuse reflected light from the vertex and the specular block include circuitry for determining the specular components of the reflected light from the vertex. Each of the blocks determines components on a per light basis. Therefore, each of a specular, diffuse, spot, and attenuation blocks are provided information for a number of light sources, and sequentially calculate the color at each vertex on a per light basis.

The combiner block combines the components from each of the specular, diffuse, spot, and attenuation blocks in accordance with the OpenGL lighting equation. The OpenGL lighting equation allows for multiple light sources. The specular, diffuse, spot, and attenuation blocks therefore, loop through each light source. In addition, the combiner block, in one embodiment in the invention, includes registers to temporarily store data on a per light basis, and performs a summing operation upon completion of calculations for all light sources.

Figure 4:
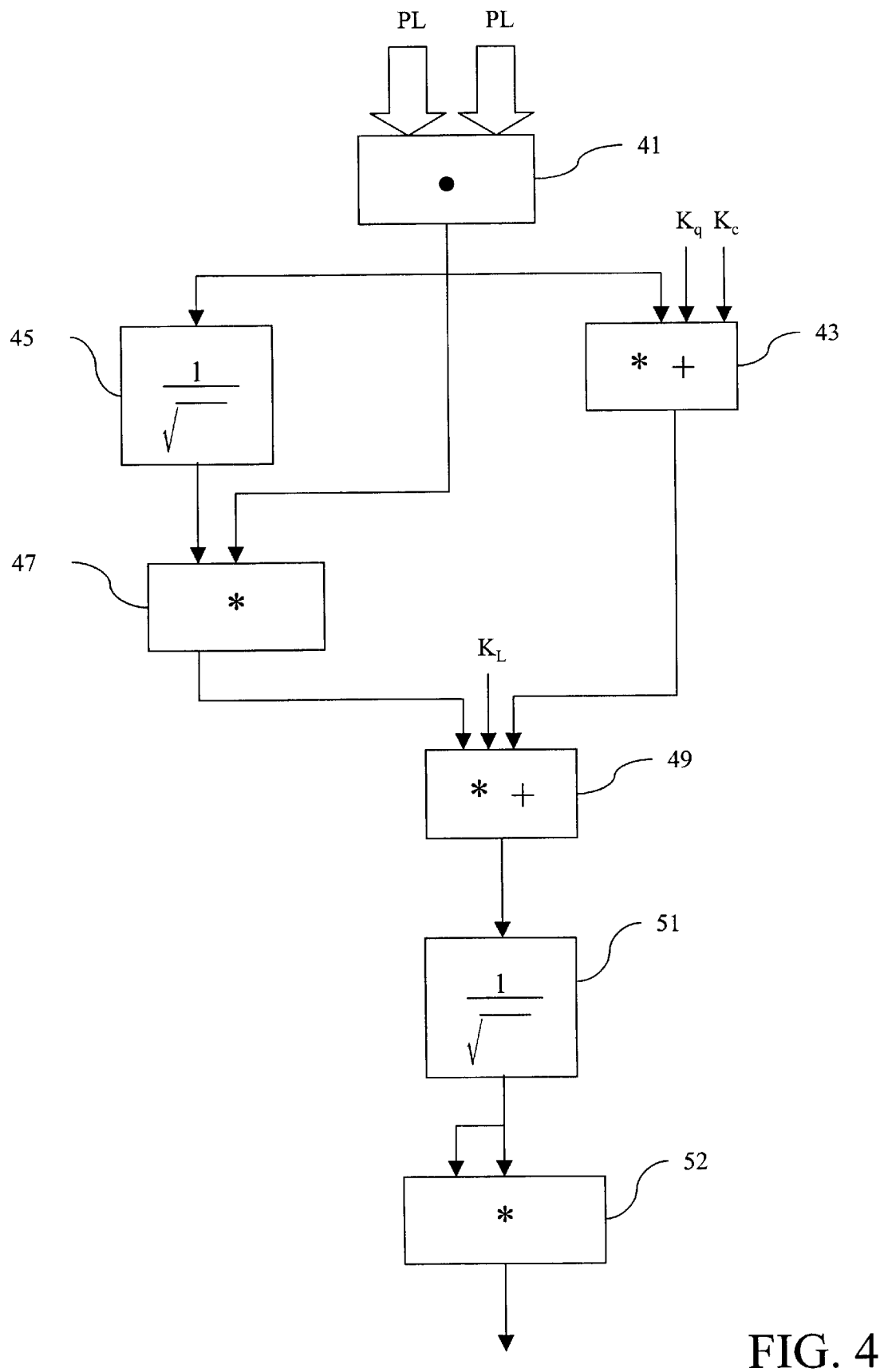
FIG. 4 is a block diagram of circuitry for performing attenuation calculations.

FIG. 4 illustrates a block diagram of an embodiment of the attenuation block of FIG. 3. Attenuation is a function of the distance between the position of a light and the position of the vertex. More specifically, attenuation is the inverse of a constant attenuation factor $k_c$ plus a linear attenuation factor $k_l$ times a distance between the vertex and the light source plus a quadratic attenuation factor $k_q$ times the square of the distance between the vertex and the light point. In other words, $att=1/(k_c+k_1d+k_qd^2)$.

The attenuation block includes a dot product block 41. The dot product block receives as inputs two vectors. The dot product block determines the dot product of the two vectors. In the case of dot product block 41 the two vectors are identical. The vectors are formed by subtracting a vector indicating the position of a light source from a vector indicating the position of a vertex. The vectors are in the form of three components, an x component, a y component, and a z component. Thus, the vectors input to dot product block 41 correspond to vectors from the light source to the vertex. As the vectors are identical, and form a vector from the vertex to the light source, the output of dot product block 41 corresponds to the square of the magnitude of the vector from the light source to the vertex.

Figure 8:
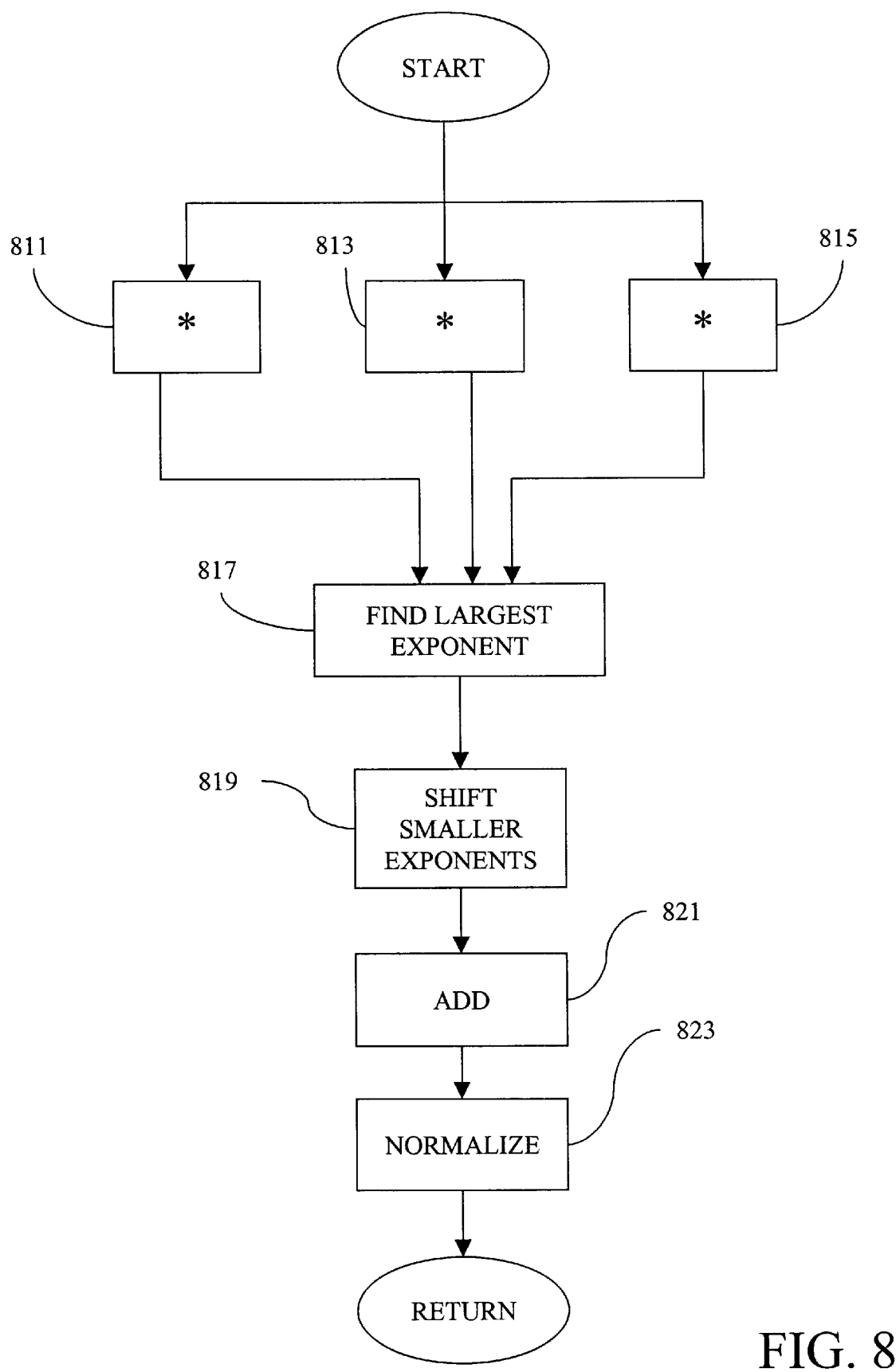
FIG. 8 is a flow chart of a process for performing a dot product calculation.

FIG. 8 illustrates a flow chart of a process implemented by the dot product block. Although the dot product block is implemented, in the embodiment described, using logic circuitry, those skilled in the art will recognize how to implement the process illustrated in FIG. 8 in terms of logic circuitry. This may be accomplished using a hardware description language (HDL), for example. In blocks 811, 813, 815 the process performs three multiplies in parallel. A dot product of a vector $\vec{V}_1 = a_1x + b_1y + c_1z$ and a vector $\vec{V}_2 = a_2 \times b_2y + c_2z$ is $a_1a_2 + b_1b_2 + c_1c_2$. Accordingly, in blocks 811, 813, 815 the process multiplies $a_1 \times a_2$, $b_1 \times b_2$, and $c_1 \times c_2$. The three multiplies generate a mantissa and an exponent for each multiply. In block 817 the process finds the largest exponent of the three exponents. In block 819 the process shifts the mantissas associated with the smaller exponents to the right. In block 821 the process adds the post-shift three mantissas. In block 823 the process normalizes the results, and thereby determines the result of the dot product.

Returning now to FIG. 4, the results of the dot product calculation are provided to an inverse square root block 45 and a multiply-add block 43. The inverse square root block inverts the result of the dot product calculation and takes its square root. In the embodiment described this is accomplished using a lookup table and performing interpolation. Thus, in one embodiment, the table has 128 entries, and provides 25 bits output. A table entry is determined using a majority of the most significant bits of the mantissa of the result of the dot product calculation to select the table entry.

The output of the inverse square root block is provided to a multiply block 47. The multiply block is also provided the result of the dot product calculation. The output of the multiply block 47, therefore, is the square root of the dot product, which corresponds to the distance between the light source and the vertex.

The result of the dot product calculation is also provided to a multiply-add block 43. The multiply-add block receives three inputs and provides one output. The output is formed by multiplying the first two inputs and adding the third input to the result. The first input to the multiply-add block 43 is the result of the dot product calculation, which corresponds to the square of the distance in the light source to the vertex. A second input to the multiply-add block 43 is the constant $k_q$. The third input to the multiply-add block 43 is the constant $k_c$. Thus, the output of the multiply-add block 43 is $k_qd^2 + k_c$.

Figure 9:
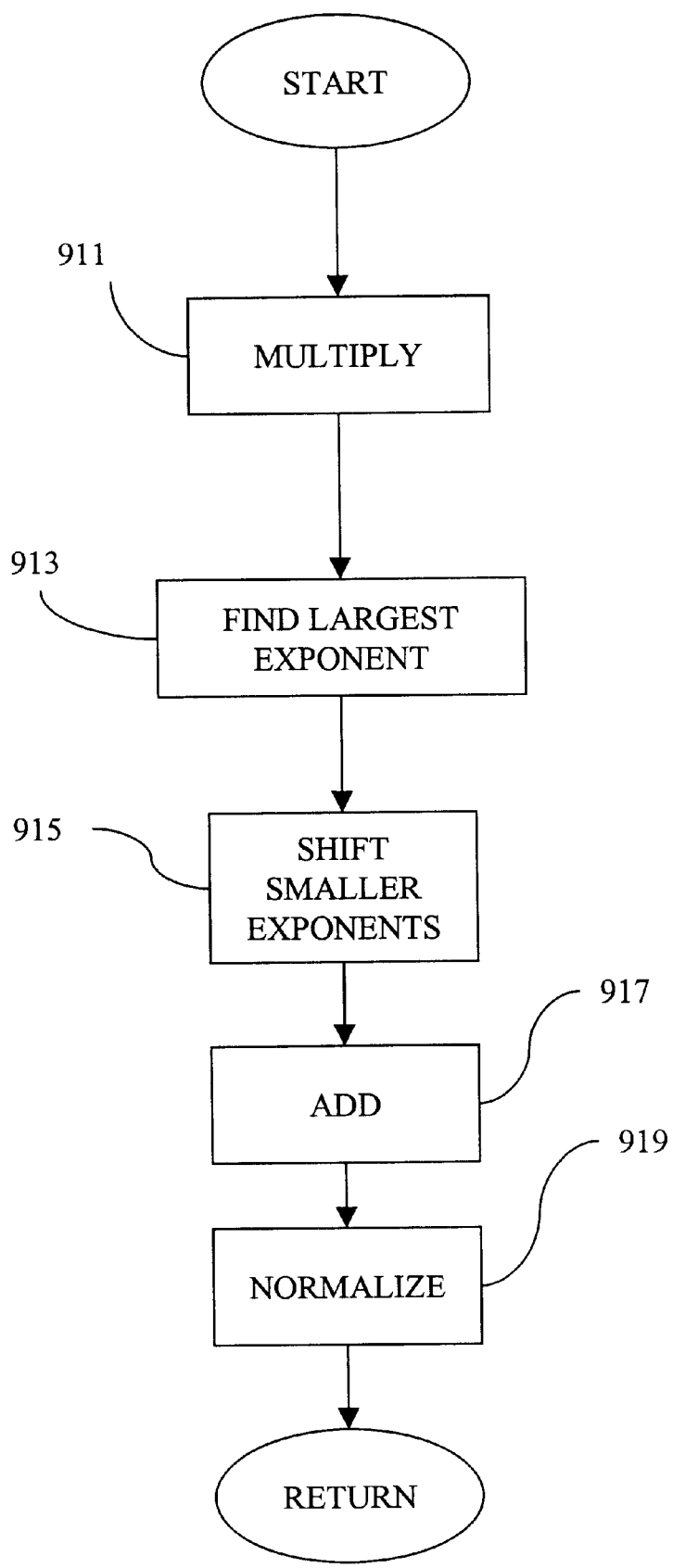
FIG. 9 is a flow chart of a process for performing a multiply and add calculation.

FIG. 9 illustrates details of a process performed by the multiply-add block. Although the multiply-add block is described with respect to a process, those of skill in the art will easily recognize how to implement the process of FIG. 9 logic circuitry using, for example, HDL or the like. In block 911, the process multiplies the first two inputs. The result of a multiply is a number with both a mantissa and an exponent. In block 913 the process determines the largest exponent of the results of the multiply and the third input. In block 915 the process shifts the mantissa associated with the smaller exponent to the right. In block 917 the process adds the mantissas, and in block 919 the process normalizes the result.

Returning now to FIG. 4, a second multiply-add block 49 receives as inputs the output of the multiply block 47, which corresponds to the distance between the vertex and the light source, a constant $k_l$, and the output of the multiply-add block 43. As may be recalled, the output of the multiply-add block 43 is $k_qd^2 + k_c$. Accordingly, the output of the second multiply-add block 49 is equal to $dk_l + k_qd^2 + k_c$, which is simply $k_c + k_ld + k_qd^2$.

In accordance with the above discussed lighting equations, however, the attenuation factor is $1/(k_c + k_ld + k_qd^2)$. Accordingly, the result of the second multiply-add block is passed first through an inverse square root block 51, with the result of the inverse square root block 51 passed as both inputs to a multiply block 52. The output of the multiply block 52, therefore, is $1/(k_c + k_ld + k_qd^2)$, which is the attenuation factor.

Figure 5:
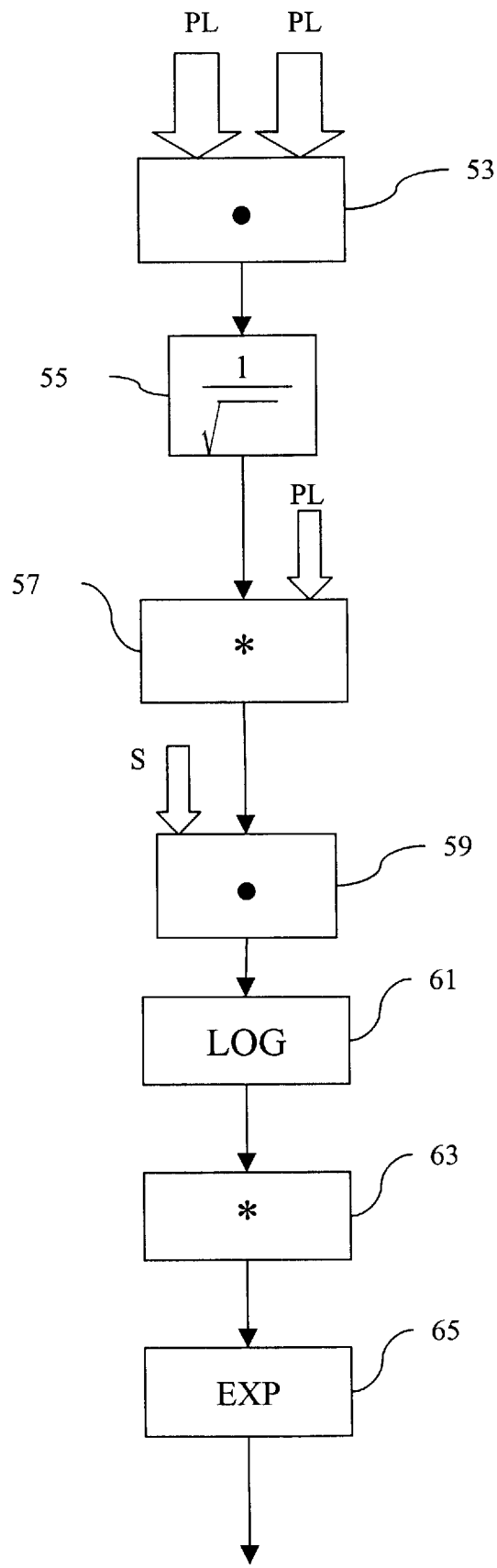
FIG. 5 is a block diagram of circuitry for performing spotlight calculations.

The attenuation factor is multiplied by, among other items, the spotlight factor. The spotlight factor is determined by the spot block of FIG. 3. FIG. 5 illustrates a block diagram of an embodiment of the spot block. The spotlight factor is determined by taking a dot product between a unit vector in the spotlight direction and a unit vector from the vertex to the light source, and raising the dot product by a spotlight exponent. In other words, the spotlight component is $$\left(\frac{\vec{PL}}{|\vec{PL}|} \cdot \frac{\vec{s}}{|\vec{s}|}\right)^{(spotlight)}$$

Accordingly, the spotlight block includes a dot product block 53. The dot product block 53 receives as inputs vector components for the vector from the vertex to the light source. The output of the dot product block 53, therefore, is equal to the square of the magnitude of the vector from the vertex to the light source.

The output of the dot product block is provided to an inverse square root block 55. The output of the inverse square root block 55 is provided as one input to a multiplier block 57. The other input to the multiply block 57 is the vector from the vertex to the light source. The output of the inverse square root block 55, therefore, corresponds to $1/d$, where d is the distance from the vertex to the light source. Accordingly, the output of the multiplication block 57 corresponds to a normal vector in the direction from the vertex to the light source. The output of the multiplication block 57 is provided as one vector input to a dot product block 59. A second vector input to the dot product block 59 is the spotlight direction vector. Thus, the output of the dot product block 59 is $$\left(\frac{\vec{PL}}{|\vec{PL}|} \cdot \frac{\vec{s}}{|\vec{s}|}\right)^{(spotlight)}.$$

$$\left(\frac{\vec{PL}}{|\vec{PL}|} \cdot \frac{\vec{s}}{|\vec{s}|}\right)^{(spotlight)}$$

is raised to the spotlight exponent, the output of the dot product block 59 is provided to a log block 58. The output of the log block 58 is provided as one input to a multiplier block 60. The other input to the multiply block 61 is the spotlight factor. Thus, the output of the multiply block 61 is the spotlight factor times log $$\left(\frac{\vec{PL}}{|\vec{PL}|} \cdot \frac{\vec{s}}{|\vec{s}|}\right)^{(spotlight)}.$$

The output of the multiplier block is provided to an exponent block 61. The output of the exponent block is $$\left(\frac{\vec{PL}}{|\vec{PL}|} \cdot \frac{\vec{n}}{|\vec{n}|}\right)^{(spotlight)},$$

which is the spotlight factor.

Figure 6:
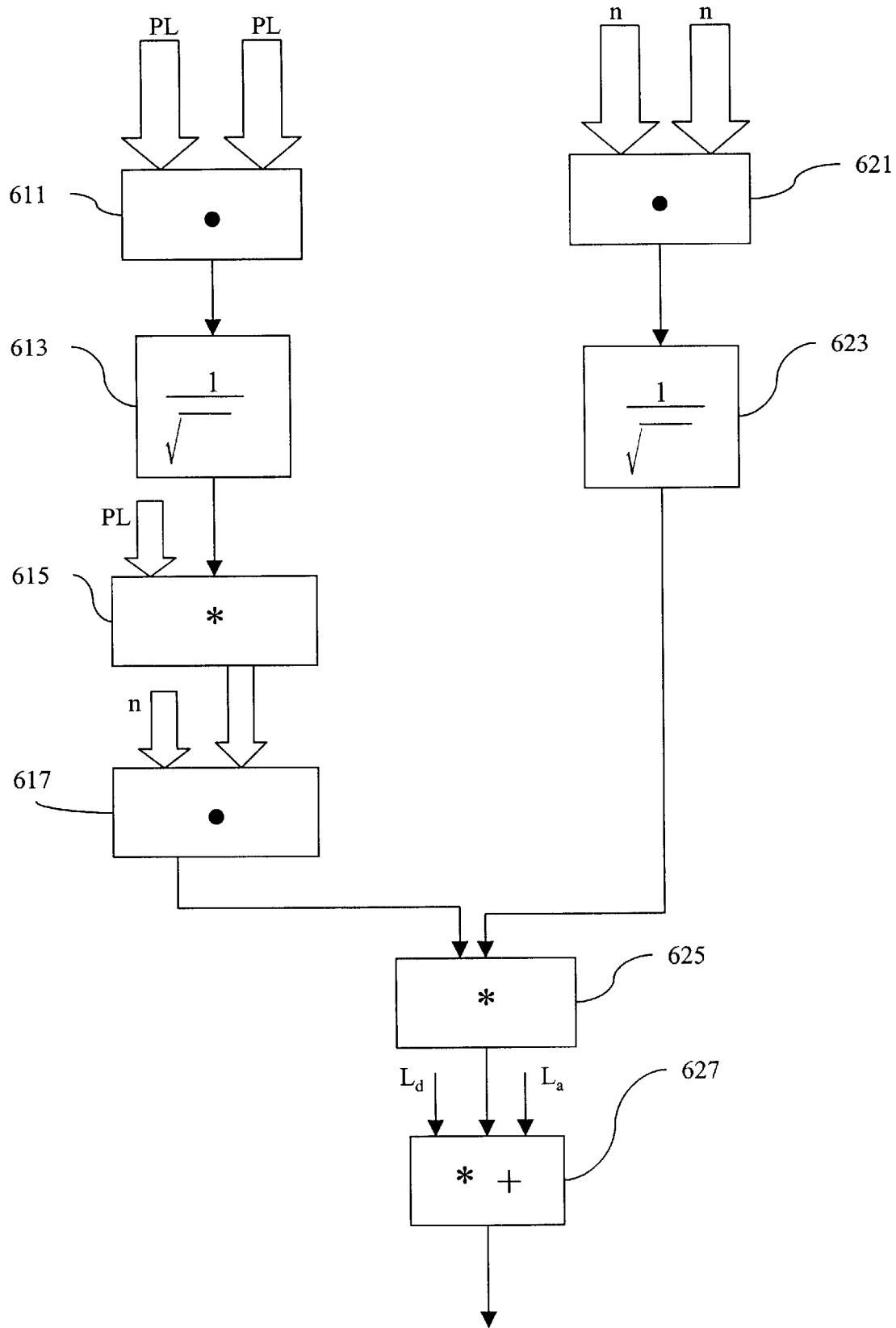
FIG. 6 is a block diagram of circuitry for performing diffuse lighting calculations.

The attenuation factor and the spotlight factor are multiplied with the diffuse and ambient components. In the embodiment of FIG. 3 the diffuse and ambient components are determined by the diffuse block. FIG. 6 illustrates a block diagram of an embodiment of the diffuse block of FIG. 3. The diffuse component of lighting on a vertex is a function of the diffuse intensity of a light, the diffuse color of a vertex, the distance between the vertex and the light source, and the angle between the vertex and the light source. More specifically, the diffuse component is equal to $$\left(\frac{\vec{n}}{|\vec{n}|} \cdot \frac{\vec{PL}}{|\vec{PL}|}\right) L_d.$$

In addition, in the embodiment described, the diffuse block also calculates the ambient lighting component, and adds the ambient lighting component to the diffuse lighting component. The ambient lighting, $L_a$, component is simply a function, specifically multiplication, of the ambient color of a vertex and the ambient color of a light.

The diffuse block includes a dot product block 611. Dot block product 611 receives as inputs components for the vector from the vertex to the light source. The results of the dot product block 611 are passed to an inverse square root block 613. The inverse square root block 613, therefore, outputs the inverse of the magnitude of the vector from the light source to the vertex. The output of the inverse square root block 613 is provided to a multiply block 615. The multiply block 615 receives as a second input the components of the vector from the vertex to the light source. As the multiply block 615 receives as inputs a vector from the vertex to the light source and an inverse of the magnitude of the vector from the vertex to the light source, the output of the multiply block 615 is a unit vector in the direction from the vertex to the light source. The vector from the vertex to the light source is provided as one input to a dot product block 617. The dot product block 617 also receives as an input components of a normal vector from the vertex. The output of the dot product block 617, therefore, is $$\left(\frac{\vec{PL}}{|\vec{PL}|} \cdot \vec{n}\right).$$

The normal vector $\vec{n}$ is potentially not a unit vector. This may be due to rounding errors, data inconsistency, or other reasons. Accordingly, the result of the dot product block 617 is multiplied by the inverse of the magnitude of the normal vector in multiply block 625. The inverse of the magnitude of the normal vector is determined using the dot product block 621 and the inverse square root block 623. The dot product block 621 receives as inputs components of the normal vector. The output of the dot product block 621 is provided to the inverse square root block 623. The output of the inverse square root block 623, therefore, is the inverse of the magnitude of the normal vector.

The output of the multiply block 625 is provided to a multiply-add block 627. The multiply-add block 627 receives as a first input a factor equal to diffuse light times diffuse material, namely $L_d$. A second input to the multiply-add block is the normalized dot product value. The third input to the multiply-add block 627 is a factor equal to ambient light times ambient material, $L_a$. Thus, the output of the multiply-add block 627 is equal to the ambient component plus the diffuse component of the lighting equation. In other words, the output of the multiply-add block 627 is equal to $$L_a + \left(\frac{\vec{n}}{|\vec{n}|} \cdot \frac{\vec{PL}}{|\vec{PL}|}\right) L_d.$$

and the output of the multiply-add block 627 is therefore the diffuse and ambient components of lighting for a vertex.

Figure 7A:
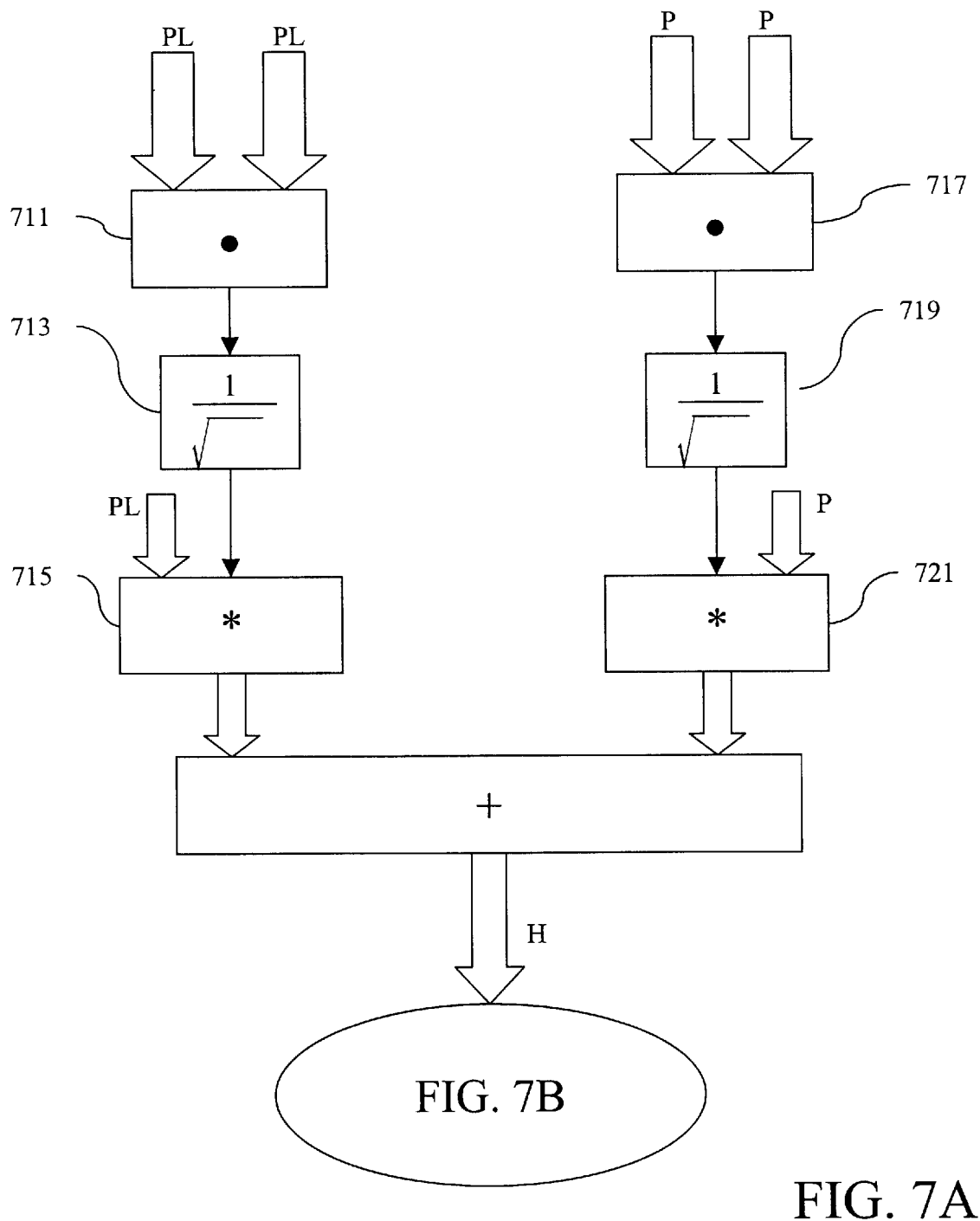
FIGS. 7A and 7B are block diagrams of circuitry for performing specular lighting calculations.
Figure 7B:
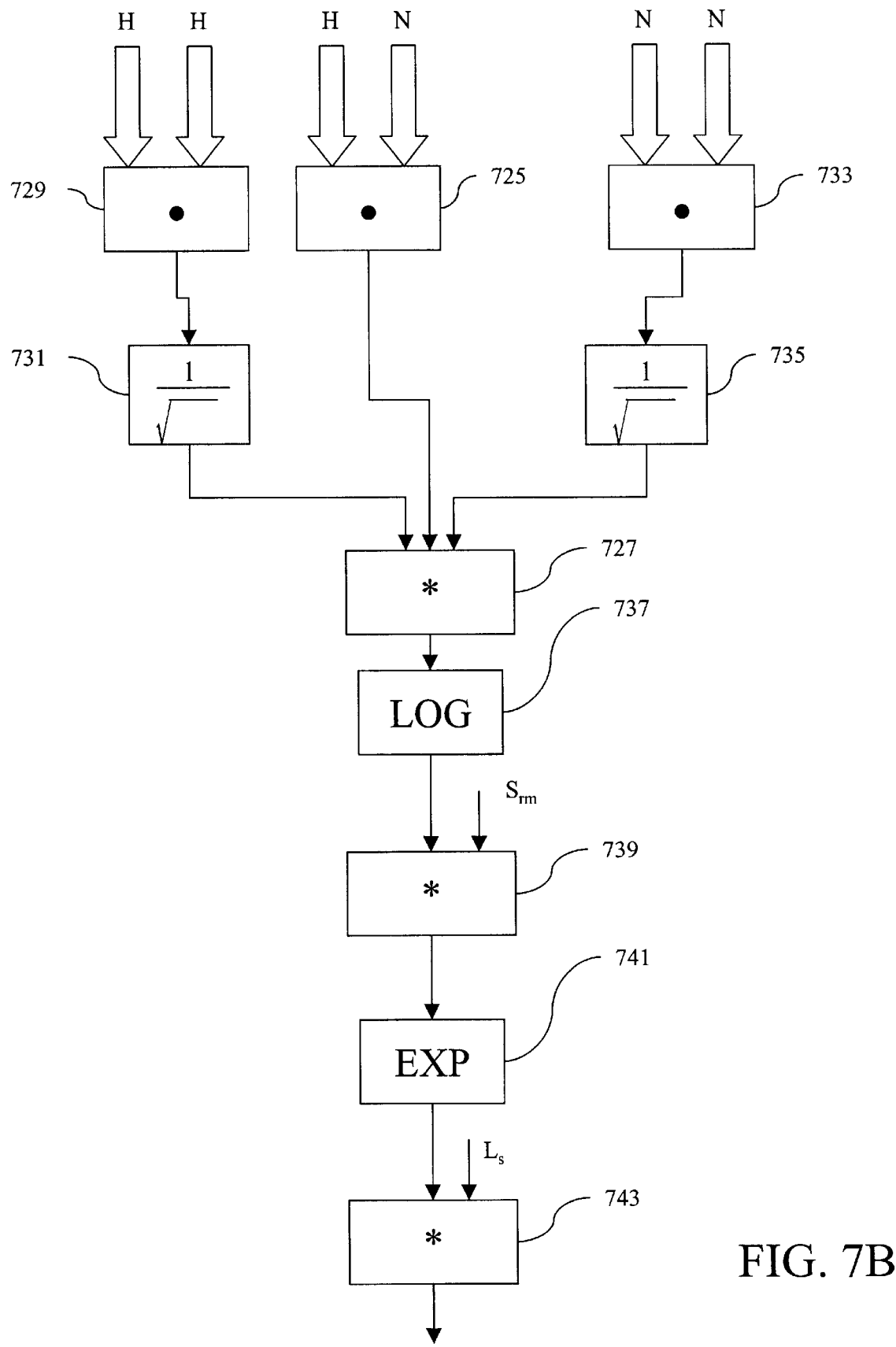

FIG. 7 illustrates a block diagram of an embodiment of the specular block of FIG. 3. The specular component of lighting on a vertex is a function of the relative position of the light source in the vertex, the relative position of the vertex and the eye point, and specular components of the material in the light source. More specifically, the specular component is provided by $$c_s = \sum_{i=0}^{n-1} (att_i)(spot_i) \left(\frac{\vec{n}}{|\vec{n}|} \cdot \frac{\vec{PL}+\vec{P}}{|\vec{PL}+\vec{P}|}\right)^{Srm} * L_s$$

The specular block therefore includes circuitry for determining the unit vector in the direction from the vertex to the light source and the unit vector from the eye point to the vertex. The unit vector from the vertex to the light source is determined by providing the components of the vector from the vertex to the light source to a dot product block 711. The output of the dot product block is provided to an inverse square root block 713. The output of the inverse square root block 713 is provided as one input to a multiply block 715. The other input of multiply block 715 are the components of the vector from the vertex light source. The output of the multiply block 715, therefore, corresponds to a unit vector in the direction from the vertex to the light source.

Similarly, a dot product block 717 is provided as inputs components of the vector from the eye point to the vertex. The output of the dot product block 717 is provided to an inverse square root block 719. The output of the inverse square root block 719 is provided as one input to a multiply block 721. The other input to the multiply block 721 are the components of the vector from the eye point to the vertex. Thus, the output of multiply block 721 corresponds to a unit vector from the eye point to the vertex.

The outputs of blocks 715 and 721 are added together in block 723 to obtain $\vec{H}$. $\vec{H}$ is combined with the normal from the vertex $\vec{n}$ using a dot product operation to obtain a portion of the specular component of lighting. In addition, to further increase accuracy, the magnitudes of the $\vec{H}$ and $\vec{n}$ vectors, which in theory should be unity, are also determined to scale the result. Thus, dot product block 725 is provided the components of $\vec{H}$ and components of $\vec{n}$. The output of dot product block 725 is provided as one input to a multiply block 727. The multiply block 727 is also provided inputs corresponding to the inverse of the magnitudes of $\vec{H}$ and $\vec{n}$, respectively. In practice, the multiply block 727 is generally six multiply blocks, one for each component of the two vectors, with each multiply block performing a multiplication of two numbers.

The inverse of the magnitude of H is provided by providing the components of $\vec{H}$ to a dot product block 729. The output of the dot product block 729 is provided to an inverse square root block 731. The output of the inverse square root block 731, therefore, corresponds to the inverse magnitude of $\vec{H}$. Similarly, components of $\vec{n}$ are provided to a dot product block 733. The output of the dot product block 733 is provided to an inverse square root block 735. The output of the inverse square root block therefore corresponds to the inverse magnitude of the normal vector $\vec{n}$. The outputs of inverse square root blocks 731 and 735 are provided, as mentioned above, to the multiply block 727.

The output of the multiply block 727 is therefore a normalized portion of the specular component of lighting. The product $\vec{n} \cdot \vec{H}$, however, should be raised to the exponent $S_{rm}$ which is the shininess factor, in order to comply with lighting equation standards. Accordingly, the output of multiply block 727 is provided to a log block 737. The output of the log block 737 is provided to a multiply block 739. The multiple block has its other input the shininess factor $S_{rm}$. The output of a multiply block 739 is provided to an exponent block 741. Finally, the output of the exponent block 741, which corresponds to $(\vec{n} \cdot \vec{H})^{Srm}$ is provided to a multiply block 743. The multiply block 743 has as its other input a specular factor, $L_s$, which is equal to a specular component of lighting of the material at the vertex and the specular component of lighting of the light source.

Figure 10:
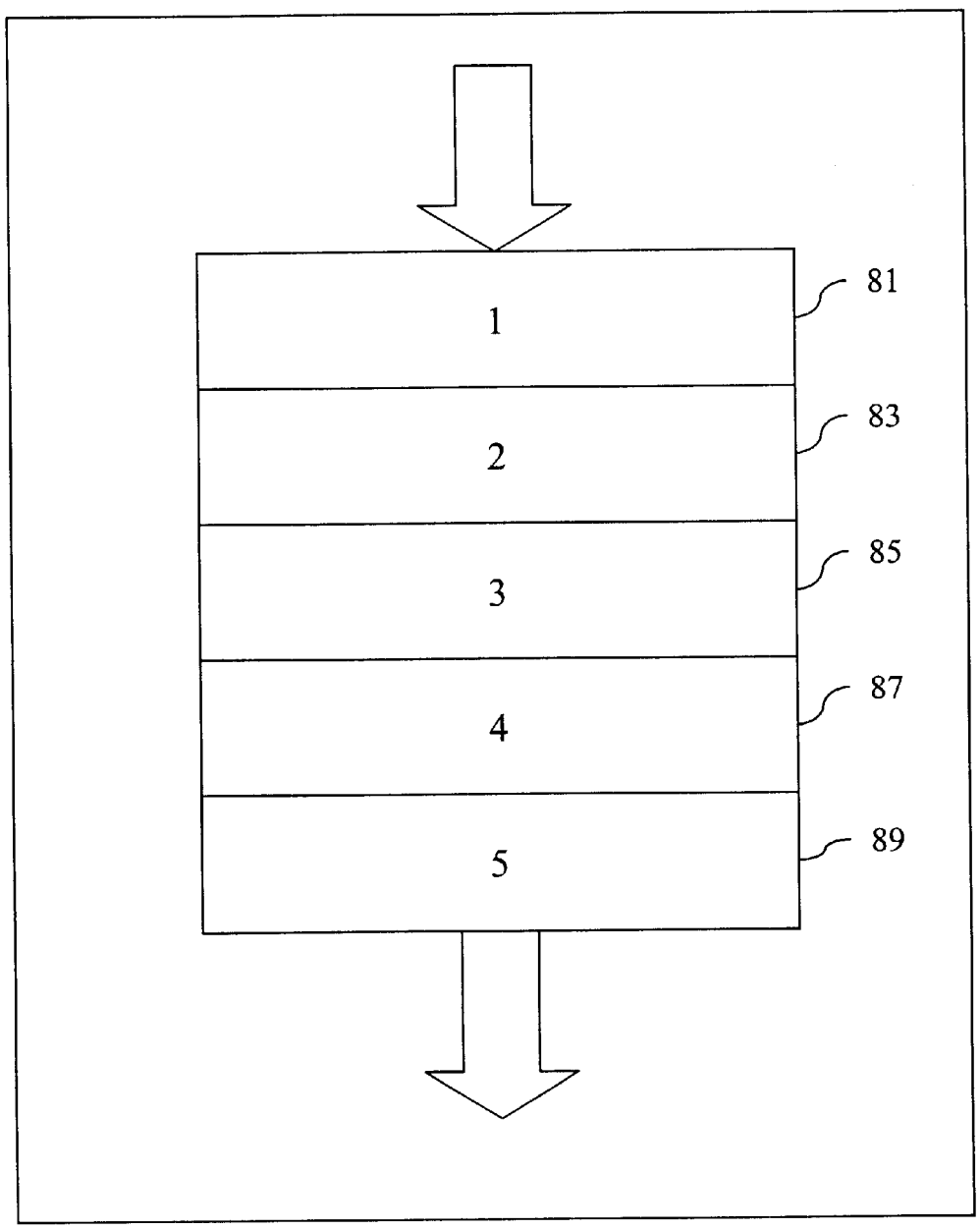
FIG. 10 is a block diagram illustrating a pipe line lighting computation unit.

FIG. 10 illustrates a block diagram of another embodiment of a lighting engine in accordance with the present invention. FIG. 10 is a block diagram of a pipeline lighting calculation engine. The specular, diffuse, spotlight, and attenuation blocks described with respect to the embodiment of FIG. 3 utilize many of the same calculations. For example, all of the specular, diffuse, spotlight, and attenuation blocks calculate the dot product of the components of the vector from the vertex to the light source, as well as take the inverse square root of the output of such a dot product. Combining the separate blocks in a single pipeline flow allows for reduction of duplication of common circuitry. Thus, for example, in Stage 1 81 the vector from the vertex to the light source is calculated, and dot products of the vector from the vertex to the light source and the normal vector obtained. In Stage 2 83 the inverse magnitudes of the vector from the vertex to the light source and the normal vector are obtained. Stage 3 provides circuitry for determining the H vector, the dot products for the H and N vectors, the dot product for the normal from the vertex to the light source and the normal from the vertex, and from the dot product from the normal from the vertex to the light source and the spotlight direction. In addition, the third stage determines the components of the attenuation factor and the diffuse factor. Further this spotlight factor is determined in Stage 3.

Stage 4 combines the results of Stage 3, and additionally determines the spotlight exponent. Stage 5 combines the results of Stage 4, and determine the colors attributable to a specific light source. When more than one light source is used, the five stages described are provided new input signals which determine the contribution from each new light source.

Figure 11:
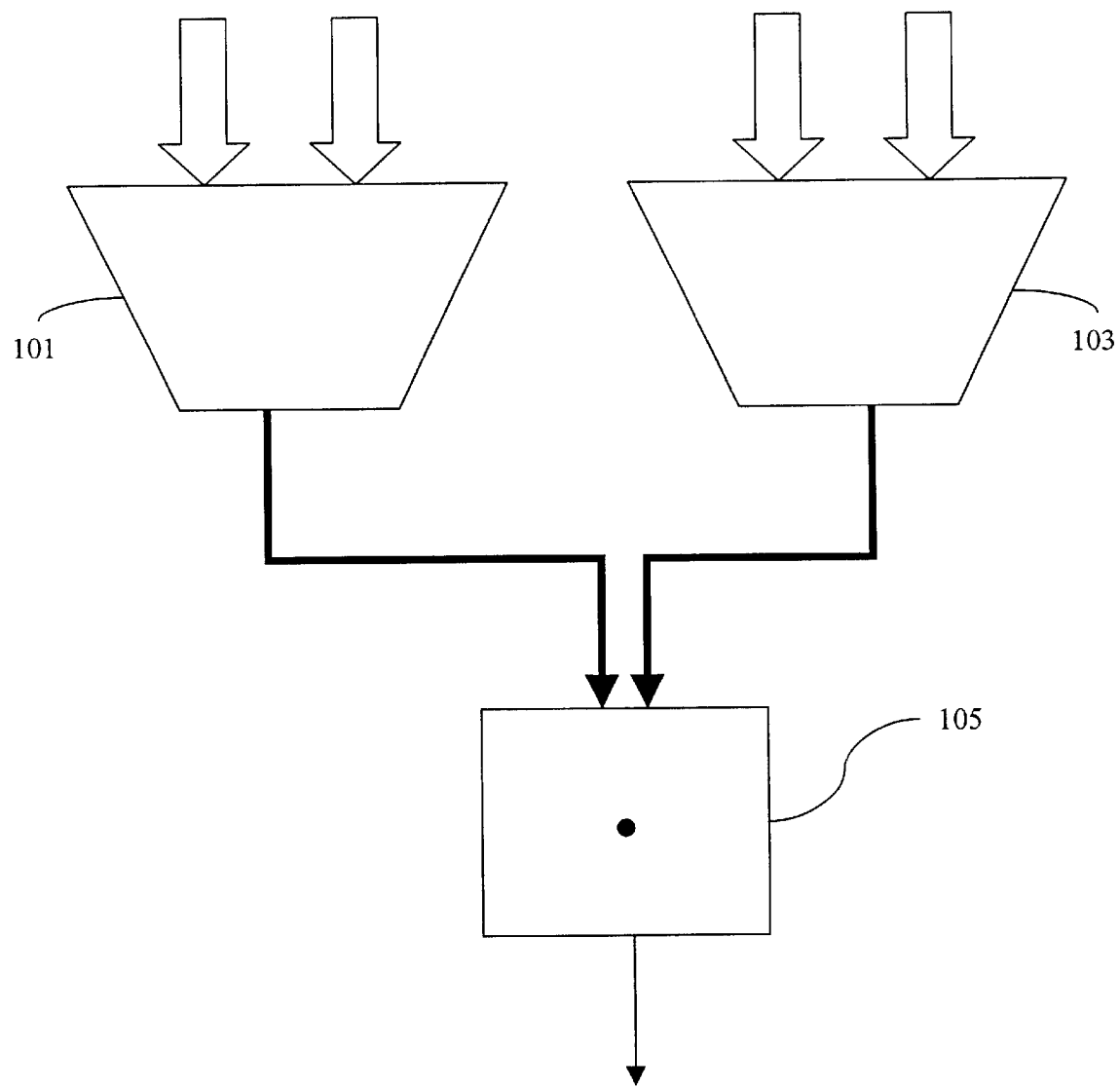
FIG. 11 is a block diagram of a multi-use circuitry for performing dot product calculations.

In further embodiments the layout area of logic circuitry is further reduced through the reuse of circuitry requiring significant space, such as dot product circuitry. FIG. 11 illustrates a block diagram of circuitry utilizing reuse of a dot product block. The circuit of FIG. 11 includes a first multiplexer 101 and a second multiplexer 103.

Each of the multiplexers 101, 103 receive as enponents components of two vectors. The multiplexers 101, 103 also receive as an input a control signal (not shown). The control signal is based on clock periods. As will become apparent, the timing of the control signal to the multiplexers 101, 103 is dependent on the throughput of the dot product block 105.

The outputs of the multiplexer blocks are provided to the dot product block 105. Accordingly, during the first set of time periods the first vectors from the multiplexer blocks 101, 103 are provided to the dot product block. During a second group of time periods the second vectors from the multiplexer blocks 101, 103 are provided to the dot product block 105. Thus, the dot product block 105 calculates dot products for two different sets of input vectors.

Returning now to the pipeline embodiment of FIG. 10, use of the circuitry described in FIG. 11 allows for reduction in the number of dot product blocks. In the embodiment of FIG. 10, a single dot product block in Stage 1 determines both the dot product of the normal vector as well as the dot product of the vector from the vertex to the light source and the vector from the eye point to the vertex. Similarly, in Stage 3 a single dot product block determines the dot product of the normal from the vertex and the normal from the vertex to the light source, the dot product of the spotlight direction and the normal from the vertex to the light source, the dot product of the H factor, and the dot product of the H vector and the N vector.

Accordingly, the present invention provides for a lighting calculation engine. Although this invention has been described in certain specific embodiments, many additional modifications and variations would be apparent to those skilled in the art. It is therefore to be understood that this invention may be practiced otherwise as specifically described. Thus, the present embodiments of the invention should be considered in all respects as illustrative and not restrictive, the scope of the invention to be determined by the claims supported by this application and their equivalents rather than the foregoing description.

What is claimed is:

1. A geometry engine in a graphics processing system, the geometry engine including a lighting engine, the lighting engine comprising:
   a light state register, the light state register storing data relating to light sources; and
   a light computation unit, the light computation unit configured to calculate effects on objects and including a plurality of stages, the plurality of stages includes a first stage, the first stage including dot product circuitry, the dot product circuitry further including circuitry for performing a plurality of multiplies in parallel, each of the plurality of multiplies generating a mantissa and an exponent, the plurality of stages configured to perform specular, diffuse, spot, and attenuation calculations, the plurality of stages further being arranged in a pipeline flow, with preceding stages providing data to succeeding stages.

2. The geometry engine in a graphics processing system, the geometry engine including a lighting engine, of claim 1 wherein the plurality of stages includes a first stage, the first stage including dot product circuitry.

3. The geometry engine in a graphics processing system, the geometry engine including a lighting engine, of claim 2 wherein the dot product circuitry includes circuitry for performing three multiplies in parallel, each of the multiplies generating a mantissa and an exponent.

4. The geometry engine in the graphics processing system, the geometry engine including the lighting engine of claim 1 wherein the dot product circuitry further includes circuitry for determining the largest exponent generated by the plurality of multiplies, for shifting the mantissas associated with the other exponents to generate post-shift mantissas, and for adding the post-shift mantissas.

5. The geometry engine in the graphics processing system, the geometry engine including the lighting engine of claim 1 wherein the first stage further comprises a first multiplexer and a second multiplexer, the first multiplexer receiving signals representative of a first vector and signals representative of a second vector, the second multiplexer receiving signals representative of a third vector and signal representative of a fourth vector, the first multiplexer providing the dot product circuitry the signals representative of the first vector and the second multiplexer providing the dot product circuitry the signal representative of the third vector on a first clock cycle, and the first multiplexer providing the dot product circuitry the signals representative of the second vector and the second multiplexer providing the dot product circuitry the signals representative of the fourth vector on a second clock cycle.

6. The geometry engine in a graphics processing system, the geometry engine including a lighting engine, of claim 5 wherein the plurality of stages includes five stages.

7. The geometry engine in a graphics processing system, the geometry engine including a lighting engine, of claim 6 wherein the first stage includes circuitry for determining signals indicative of the vector from a vertex to a light source and a normal vector.

8. The geometry engine in a graphics processing system, the geometry engine including a lighting engine, of claim 7 wherein a second stage includes circuitry for determining signals indicative of the inverse magnitude of the vector from the vertex to the light source and inverse magnitude of the normal vector.

9. The geometry engine in a graphics processing system, the geometry engine including a lighting engine, of claim 8 wherein a third stage includes circuitry for determining a signal indicative of an H vector and a signal indicative of a dot product of the H vector and an N vector.

10. The geometry engine in a graphics processing system, the geometry engine including a lighting engine, of claim 9 wherein a fourth stage includes circuitry for determining a spotlight exponent.

11. A lighting computation unit of a lighting engine in a graphics processing system, the lighting computation unit comprising:

an attenuation block configured to receive signals indicative of a position of a vertex and a position of a light source;

a spot block;

a diffuse block; and a specular block;

with each of the attenuation block, the spot block, the diffuse block and the specular block including a dot product circuit, the dot product circuit of the attenuation block being configured to receive signals indicative of a vector from the position of the light source to the position of the vertex, the dot product circuitry further including circuitry for performing a plurality of multiplies in parallel, each of the plurality of multiplies generating a mantissa and an exponent.

12. The lighting computation unit of claim 11 wherein the attenuation block receives signals indicative of a position of a vertex and a position of a light source.

13. The lighting computation unit of claim 12 wherein the dot product circuit of the attenuation block receives signals indicative of a vector from the position of the light source to the position of the vertex.

14. The lighting computation unit of claim 11 wherein the dot product circuit of the attenuation block comprises circuitry for determining the largest exponent generated by the plurality of multiplies, for shifting the mantissas associated with the other exponents to generate post-shift mantissas, and for adding the post-shift mantissas.

15. The lighting computation unit of claim 11 wherein the attenuation block includes a multiply-add block.

16. The lighting computation unit of claim 15 wherein the multiply-add block includes circuitry for performing multiplication of two inputs to determine a mantissa and an exponent, for determining the larger of the exponent and an exponent of a third input, and for shifting the mantissa associated with the smaller exponent.

* * * * *